United States Patent
Johnson (10) Patent No.: US 10,156,675 B1
(45) Date of Patent: Dec. 18, 2018

(54) METHOD AND APPARATUS FOR THE MODULATION OF PUMP ABSORPTION IN A CLAD OPTICAL FIBER THAT IS USED IN LASERS AND AMPLIFIERS

(71) Applicant: BAE Systems Information And Electronic Systems Integration Inc., Nashua, NH (US)

(72) Inventor: Benjamin R Johnson, Nottingham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 703 days.

(21) Appl. No.: 14/821,822

(22) Filed: Aug. 10, 2015

Related U.S. Application Data (60) Provisional application No. 62/042,440, filed on Aug. 27, 2014.

(51) Int. Cl.
  *G02B 6/028* (2006.01)
  *H01S 3/102* (2006.01)

(52) U.S. Cl.
  CPC .......... *G02B 6/0281* (2013.01); *H01S 3/1022* (2013.01)

(58) Field of Classification Search
  CPC .............................. G02B 6/0281; H01S 3/1022
  See application file for complete search history.

(56) References Cited

U.S. PATENT DOCUMENTS

| | | | | |
|---|---|---|---|---|
| 5,048,026 A | * | 9/1991 | Shaw | H01S 3/094003 359/341.3 |
| 5,508,842 A | * | 4/1996 | Takeda | H01S 3/06708 359/337 |
| 7,277,612 B2 | * | 10/2007 | Sintov | G02B 6/2804 385/39 |
| 8,509,269 B2 | * | 8/2013 | Bauer | C03B 23/207 372/39 |
| 9,634,461 B1 | | 4/2017 | Johnson et al. | |
| 2007/0229940 A1 | * | 10/2007 | Sintov | H01S 3/06754 359/341.3 |
| 2009/0285247 A1 | * | 11/2009 | Sintov | H01S 3/094003 372/6 |
| 2011/0123155 A1 | * | 5/2011 | Kumkar | G02B 6/2856 385/43 |
| 2011/0146071 A1 | * | 6/2011 | Zheng | G02B 6/2552 29/869 |

(Continued)

OTHER PUBLICATIONS

D.Kouznetsov, J.V. Moloney, Efficiency of Pump Absorption in Double-Clad Fiber Amplifiers III:Calculation of Modes, Journal of Optical Society of America B., 19(6): 1304-1309, 2003, United States.

(Continued)

*Primary Examiner* — Sung Pak
(74) *Attorney, Agent, or Firm* — Joseph E. Funk; Scott J. Asmus (57) ABSTRACT

A fiber optic modulator of pump energy comprising a piece of double clad fiber where the inner cladding layer has a changing cross sectional shape and may have a changing cross sectional area along the length of the fiber. The modulator fiber regulates how pump energy in the inner cladding layer is absorbed into the core of the fiber along the length of the fiber. This regulates how heat is generated in the fiber due to absorption into core.

19 Claims, 4 Drawing Sheets

(56) References Cited

U.S. PATENT DOCUMENTS

2013/0301116 A1* 11/2013 Kliner ............... H01S 3/2308
359/341.3
2014/0362877 A1* 12/2014 Gapontsev .......... H01S 3/06708
372/6
2016/0141826 A1   5/2016 Johnson
2016/0268762 A1   9/2016 Johnson et al.

OTHER PUBLICATIONS

S. Kawakami, S. Nishida (1974). "Characteristics of a doubly clad optical fiber with a low-index inner cladding". IEEE Journal of Quantum Electronics. 10 (12): 879-88, United States.
S. Bedo; W. Luthy; H. P. Weber (1993). "The effective absorption coefficient in double-clad fibers". Optics Communications. 99 (5-6): 331-335, United States.
Liu, K. Ueda (1996). "The absorption characteristics of circular, offset, and rectangular double-clad fibers". Optics Communications. 132 (5-6): 511-518, United States.
D. Kouznetsov, J. V. Moloney (2003). "Efficiency of pump absorption in double-clad fiber amplifiers. II: Broken circular symmetry". Journal of the Optical Society of America B. 39 (6): 1259-1263, United States.
V. Filippov, Yu. Chamorovskii, J. Kerttula, K. Golant, M. Pessa, O. G. Okhotnikov (2008)). "Double clad tapered fiber for high power applications". Optics Express. 16 (3): 1929-1944, United States.
P. Konieczny, J. Swiderski, A. Zajac, M. Skorczakowski, "Analysis of activation of active double-clad optical fibers," Optica Applicata, XXXV, 4, (2005), Poland.

* cited by examiner

METHOD AND APPARATUS FOR THE MODULATION OF PUMP ABSORPTION IN A CLAD OPTICAL FIBER THAT IS USED IN LASERS AND AMPLIFIERS

This application claims the benefit of Provisional Application No. 62/042,440, filed Aug. 27, 2014.

FIELD OF THE INVENTION

The present invention relates to the distribution of cladding pump energy in double clad cables of fiber optic lasers and amplifiers, and to using claddings to distribute unwanted heat away from areas where heat generation is the greatest.

BACKGROUND OF THE INVENTION

Double-clad fiber lasers and amplifiers can be considered to be a revolution in the laser industry. The ability of the double-clad fiber to convert low-quality, low brightness pump radiation into high brightness, signal radiation is a key attribute contributing to their success. The brightness conversion is performed by creating a situation where pump radiation inserted into the cladding intersects and is absorbed into the core of the fiber laser as the pump radiation propagates down the cladding. The core of the fiber laser contains a rare-earth dopant responsible for laser action and the core absorbs a portion of the intersecting pump radiation that is in the cladding.

More particularly, double-clad fiber lasers have provided an efficient method for generating high optical powers, average and peak, at high efficiencies. The very nature of optical fibers is conducive to high power operation. Fibers have high specific volumes that contribute to higher heat transfer capabilities, and the waveguide nature of the fiber provides high modal overlap of the pump and signal energy resulting in high conversion efficiencies. Power levels of >1 kW are readily achievable with double-clad fiber lasers with electrical efficiencies of >30%. A major limiting factor in further power scaling is the inability for a laser to dissipate the large amounts of waste heat from the rare-earth doped fiber core in a fiber laser. Such waste heat is mostly generated nearest the pump input end (launch end) of a doped fiber and its cladding in a double clad fiber laser, and the least waste heat is generated nearest the output end of the fiber.

A fiber laser can be end pumped or side pumped. In end pumping, the light from one or more pump lasers is fired into the end of the fiber laser into its core and into its cladding layer. In side-pumping, pump light is coupled into the side of the fiber; actually, it is fed into a coupler that couples it into the outer cladding core. This is different from side-pumping a laser rod, where the light comes in orthogonally to the axis.

The problem is that the doped core of the fiber laser is too small to focus the output of one or more pump diode lasers into it. To get around this problem, the diode pump laser beam is inserted into both the end of the core and into the end of the much-larger cladding layer around the core. This is called "core pumping" and "cladding pumping". To contain the pump laser beam inside the fiber laser, the core and cladding layer of the laser are clad with an outer sheath. This way, the pump beam bounces around inside the cladding around the core as the pump beam propagates along the fiber. Every time the pump beam crosses the core, some of the pump light energy is absorbed into the core.

Fiber lasers can be quite long and waste heat generated therein is distributed over the length of the fiber which helps protect the fiber from getting so hot that it breaks. However, the waste heat distribution is not uniform along the length of the fiber because most of the heat is generated near the launching end of the fiber laser. Thus, the waste heat is not optimally distributed and eliminated along the length of the fiber to maximize protection against heat damage to the fiber laser. In addition, materials change their optical properties as they heat up and that affects the quality of the laser beam generated in the core of the fiber laser.

Conventional core pumping, in which pump light is coupled only into the small core, was initially used to achieve single mode output from a laser. However, a small core causes a serious restriction on pump power level. Furthermore, the core size leads to highly localized pump intensity which usually induces thermal damage at the fiber ends. To overcome this cladding pumping has been developed which provides the ability to divide the pump power launched into double clad fiber lasers. Both the core and the inner cladding layer are pumped. Some pump power is input to the core of the fiber, and some pump light is input into the inner cladding layer and propagates through it and gradually absorbs into the doped core within the cladding layer.

Absorption of pump power inside the core of a fiber laser causes heat generation which is highest at the launch end of the fiber laser and the heat generation reduces exponentially along the axis of the fiber laser moving away from the launch end. This high heat generation at the launch end of the fiber increases the potential for fiber failure and reduces the amount of pump energy that may be input to the launch end of a high power laser.

Alternative cladding shapes have given engineers a way to increase the total absorption of pump light per length of fiber without changing fiber composition. The shaped claddings prohibit helical cladding modes from propagating, and force all cladding modes on a path that intersect the doped core of the fiber laser near its launch end and increase the heat generated thereat. This results in significantly higher pump absorption coefficients for shaped claddings versus a classic round, cylindrical cladding. Mathematically this is introduced as a cladding mode scattering coefficient $\beta$, and is related directly to the shape of the fiber cladding. The cladding mode scattering coefficient $\beta$ is highly dependent on the cladding shape and can vary drastically for the many different shapes of commercial optical fibers. While this approach increases the absorption it does not decrease the high heat generation at the launch end of the fiber laser.

Thus, there is a needed in the art for a new double clad fiber laser and a way to design the new double clad fiber laser to adjust how pump radiation is absorbed along the length of the fiber laser. This results in some of the thermal energy generated at the launch end of a double clad fiber being redistributed further down the fiber away from the launch end. The result of this is to reduce the thermal energy generated at the launch end of the fiber and allows for more pump radiation to be launched and subsequently absorbed and converted to a desired signal wavelength.

SUMMARY OF THE INVENTION

The above described need in the prior art is met by the present invention. The invention provides a method and apparatus to control the distribution of the exponential generation of thermal energy within a rare-earth doped fiber. The capabilities provided by the invention enable increased power scaling capabilities for existing double-clad fiber lasers and support the development of future devices benefiting from thermal redistribution of waste energy from launch end of the laser gain medium.

The advantage of the invention may be understood by considering power absorption in the doped fiber of a fiber laser occurs at the beginning of the fiber where the pump radiation is launched. For example, a Thulium doped fiber is a double clad fiber with an octagonal "pump" cladding layer for increased effective pump absorption into the core of the fiber for greater efficiency. However, increasing the absorption of the pump energy into the core of the fiber at the launch end increases the thermal heat generated at the launch end. The fiber more easily reaches its thermal limit and catastrophic failure occurs. This occurs more easily for high power CW lasers, because the launch end of the doped fiber is under the greatest thermal stress.

Reducing the thermal stress at the launch end of the laser fiber allows for more pump radiation to be launched into the laser to increase efficiency. The invention provides this capability by redistributing the generation of thermal energy in a Thulium doped fiber from the launch end to further down the fiber. Stated another way, the invention optically displaces some of the pump energy in the cladding layer to be gradually absorbed into the core of the fiber away from the launch end of the doped fiber and thereby redistributes the thermal energy along the fiber to effectively reduce the total heat flux at and near the launch end of the doped fiber. This permits a larger amount of pump light to be launched into a particular fiber resulting in an increase in total power output for a particular fiber laser design.

More particularly, the invention redistributes the generation of thermal energy away from the launch end of the fiber, adjacent to a high reflector Bragg grating, to several centimeters further along the fiber by modulating an effective cladding mode scattering coefficient ($\beta$) for that several centimeter piece of fiber. The coefficient ($\beta$) determines the probability that cladding modes will scatter and intersect the core of the fiber further from the launch end of the fiber than normally occurs. Thus, the high heat flux normally at the launch end of the fiber is moved further along the fiber.

The invention exploits the ability of a double clad fiber to support helical cladding modes by selectively allowing such modes to propagate through the novel several centimeter piece of fiber, with minimal absorption by the core of that short piece of fiber, until past the short piece of fiber where the helical modes are diminished and the pump signal is scattered through the Thulium doped core of the fiber and converted to high brightness, signal radiation. To do this the novel piece of fiber has a tapered, geometrically structured cladding that induces a differential cladding mode scattering coefficient ($\beta$) in the axial direction of the fiber. The cladding mode scattering differential coefficient ($\beta$) is implemented by gradually changing the cross sectional shape of the cladding of the novel piece of fiber to induce a desired, changing amount of cladding mode scattering along the novel piece of fiber and hence a desired change in the effective pump absorption along the novel fiber. That is, using a geometrical tapering of two or more cladding shapes an equalizing gradient may be achieved that effectively redistributes the absorption of pump radiation in the core to further down the doped fiber away from the launch end. This redistribution of pump radiation absorption reduces the thermal load at the launch end of the fiber adjacent to the high reflector Bragg grating. The heat flux at the launch end of the fiber is reduced allowing for more pump radiation to be launched and subsequently absorbed and converted to a desired signal wavelength.

DESCRIPTION OF THE DRAWINGS

The invention will be better understood upon reading the following Detail Description in conjunction with the drawing in which.

DETAILED DESCRIPTION

In the following description the term "fiber" refers to a doped core, one or more cladding layers around the doped core, and a sheath or jacket around the outside.

Figure 1:
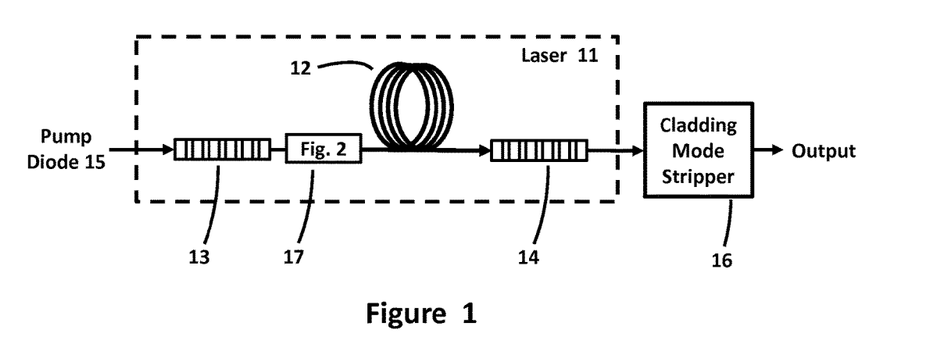
FIG. 1 is a block diagram of a simple, conventional double clad fiber laser showing where the invention is located at the launching end of a laser.

FIG. 1 is a block diagram of a simple, conventional double clad fiber laser 11 utilizing the teaching of the invention. Laser 11 is composed of a doped fiber 12, a high reflector Bragg grating 13 having a round cross sectional shape with a pump diode 5 applying pump signal thereto, a low reflector Bragg grating 14 and a cladding mode stripper 16. In accordance with the teaching of the invention a piece of geometrically modified fiber 17 is inserted between high reflector 13 and laser fiber 12. The length of novel modified fiber 17 depends on how far from the launch end of doped fiber 12, adjacent to high reflectance Bragg grating 13, a designer wishes to move pump energy before it is converted to other pump modes that are more easily absorbed into core 17c. The core of both novel modified fiber 17 and laser fiber 12 are thulium doped, but other dopants may be substituted depending on the design of laser 11. Fiber 17 has a novel tapered, geometrically modified cladding shape, with a first cross-sectional shape at one end and a different cross-sectional shape at the other end. More particularly, the cross-sectional shape of the novel piece of doped fiber 17 is circular at its input and gradually changes to an octagonal cross sectional shape at its output end to create a differential cladding mode scattering coefficient (β). While preferentially, the rate of change between the circular and octagonal cross-sectional shapes is uniform over the length of fiber 17 other non-uniform change rates may be utilized. In addition, other cross sectional shapes at either end of fiber 17 may be utilized to further modify the absorption rate of pump energy into its core 17c.

Figure 2:
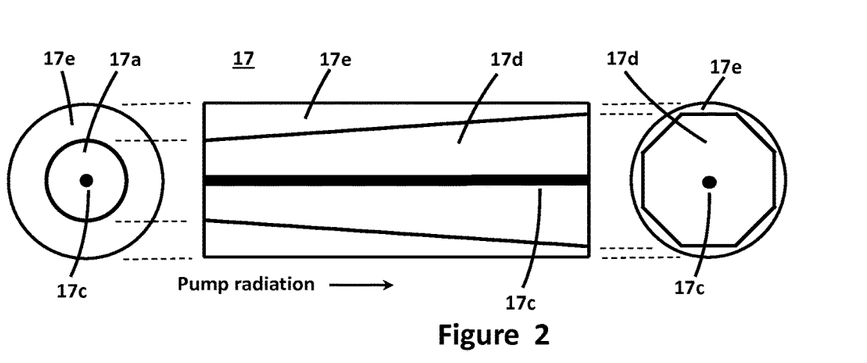
FIG. 2 shows the modified cross section of a piece of fiber, in accordance with the teaching of the invention, that is connected to the launching end of the fiber laser to redistribute the absorption of pump signal into the core of the fiber and thereby redistribute the generation of thermal energy, normally highest at the launching end of the fiber, to further along the fiber.

The circular cross section launch end of fiber 17 creates a helical pumping mode for the pump energy input to the cladding layer of novel fiber 17 at its launch end. Over the length of novel fiber 17 the changing cross-sectional shape of the cladding layer of tapered fiber 17 creates and increases other modes that cause more of the pump radiation in the cladding layer to intersect the core of fiber 17 where it is absorbed and converted to laser radiation.

Fiber Bragg gratings are created by "inscribing" or "writing" systematic (periodic or aperiodic) variation of refractive index into the core of a special type of optical fiber using an intense ultraviolet (UV) source such as a UV laser. As shown in FIG. 1 reflectors 13 and 14 are periodically scribed, but other standard variations (aperiodic) may be used as required.

FIG. 2 shows a side view of the novel piece of geometrically modified fiber 17 that is inserted between reflector 13 and fiber 12 in accordance with the teaching of the invention. FIG. 2 also shows cross-sectional views of the two ends 17a and 17b of novel fiber 17. It can be seen that the left or launch end has a circular shape 17a and the right or output end is octagonal shaped 17b. Shapes other than the octagonal shape shown for output end 17b may be used in implementing the invention. The exact size and shape of output end 17b matches the end of laser fiber cable 12. The core 17c of novel fiber 17 is thulium doped, but other dopants may be substituted depending on the design of laser 11 which includes the wavelength of light to be generated and output from laser 11. The dopant used in core 17c of novel fiber 17 is preferred to be the same as the dopant used in the core of fiber 12.

Novel fiber 17 is a double clad fiber and there is an inner cladding layer 17d and an outer cladding layer 17e. The outside diameter of outer cladding layer 17e is a uniform round shape so the thickness and shape of layer 17e varies along the length of fiber 17. It may be seen in FIG. 2 that inner cladding layer 17d is tapered so its cross sectional area progressively changes and this affects how pump radiation traveling in layer 17d will intersect core 17c and be converted to the desired wavelength.

The input end of novel fiber 17 is spliced directly to the piece of inscribed fiber that is Bragg grating 13 although it is shown slightly spaced therefrom in FIG. 1. The shape and diameter of the doped cores of Bragg grating 13 and core 17c are the same. The cross-sectional shape and diameter of the cladding layer of Bragg grating 13 and of fiber 17 are also the same. The inner cladding layer 17d of novel fiber 17, at its left or launch end is the same size and is in electrical engagement with the output of high reflector 13, and the inner cladding layer of laser fiber 12 is the same size and is in electrical engagement with the inner cladding layer 17d at the right or output side of novel fiber 17.

Figure 3:
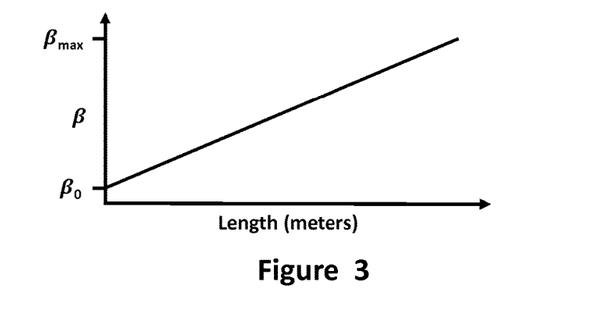
FIG. 3 is a graph showing how the modified cross section of a piece of doped fiber, in accordance with the teaching of the invention, and inserted at the launching end of the fiber changes the cladding mode scattering coefficient to redistribute the absorption of pump energy and the resulting generation of thermal energy in the core of the fiber to further down the fiber.

FIG. 3 is a graph showing the change in the effective cladding mode scattering coefficient β along the length of novel fiber 17 from $\beta_0$ to $\beta_{max}$ with $\beta_0$ being at the circular launch end 17a of fiber 17 and with $\beta_{max}$ being at the octagonal output end 17b of fiber 17. Assigning $\beta_o$=0.1 and to $\beta_{Max}$=1 a quantitative evaluation at the effectiveness of the invention may be conducted as graphed in FIGS. 5 and 6. The coefficient β determines the probability that cladding modes will scatter and intersect the core 17c of fiber 17 further from the launch end 17a of fiber 17. Coefficient $\beta_0$ indicates the lowest probability of intersecting the core and corresponds to the circular cladding shape 17a in FIG. 2 where there is a circular cladding mode and absorption into the core of fiber 17 is at a minimum. The graph in FIG. 3 is linear indicating a smooth, gradual change in how pump radiation is absorbed into core 17c along the length of novel fiber 17. Thus, the high heat flux normally at the launch end 17a of fiber 17 is spread along the fiber 17 in accordance with the teaching of the present invention. A designer may modify this curve according to needs that arise. As previously mentioned the input end of laser fiber 12 is also octagonal and the octagonal end 17b is the same shape and size and is connected thereto in a manner known in the art.

As the cross sectional shape of novel fiber 17 gradually changes from the circular shape 17a at the launch end to the octagonal shape 17b at the exit end in FIG. 2, the scattering of pump radiation also gradually increases and absorption into the core of fiber 17 increases. The rate of change between the two cross sectional shapes may be linear or it may be non-linear and may be changed for many reasons. One example is when it is desired to minimize the generation of heat at a junction with the launch end of fiber 17. In such a situation the rate of shape change may be minimized, or it may be eliminated. By keeping the cross sectional shape of the launch end 17a circular for several centimeters or more the helical cladding modes are maintained and pump energy intersecting core 17c near the launch end is minimized which results in minimizing the generation of heat near the launch end.

The present invention makes use of the fact that helical cladding modes mostly stay in the cladding layer and are not converted to laser radiation in the core of the fiber. The invention also makes use of the fact that shaped claddings (eg. octagonal cross section 17b) stop helical cladding modes from propagating, and force all cladding modes on a path that intersect the doped core 17c of the fiber to generate laser radiation. This is done by processing a piece of fiber 17, as described herein so that at one end, the launching end 17a, the inner cladding layer 17d at the launch end has a circular cross sectional shape and carries helical modes, and at the other or terminating end 17b, the same cladding layer 17d has an octagonal cross sectional shape that causes all pump energy being carried in the cladding layer 17d to be reflected to intersect the core 17c of the fiber 17 and generate laser radiation. Between the two ends the cross sectional shape of the novel fiber 17 gradually changes between the two shapes. At the launching end 17a of the novel fiber 17 the circular cross sectional shape 17a may be maintained for a short length, of say several centimeters, so that helical cladding modes are held in the cladding layer 17d. In this manner there is no heat generated in the "short length" to contribute to any possible failure of fiber 17 due to the heat generated where it is spliced to Bragg grating 13. In FIG. 2 it is seen that the cross sectional area of cladding layer 17d gradually increases along the length of novel fiber 17. As the rate of cross sectional area increases or decreases along fiber 17 it affects the overall size of the octagonal shape and also impacts the rate of pump energy intersecting core 17c. Thus, the change in cross sectional area may also be used to modulate the rate at which pump energy is absorbed into core 17c. Novel fiber 17 may be fabricated using a myriad of techniques that are all basic methods of thermal tapering whether it is straight from a draw tower or through the use of laser/plasma arc/heating element splicers and glass processing systems available to the common user. A simple fabrication technique is to prepare a portion of preformed fiber with a shaped cladding and apply a differential of thermal energy across the length of the fiber to melt the shaped cladding to a round, cylindrical cladding, or an approximate hybrid between the original cladding shape to a cylindrical shape. This process may be applied to any length of fiber required to achieve a differential cladding mode scattering coefficient β. For short lengths of fiber (~<100 mm) a splicer or glass processing machine may be used while longer lengths will require some form of fiber draw-tower.

After the initial forming of novel fiber 17 by the methods described above a second outer cladding layer 17e is added over now formed layer 17d with core 17c. The outside shape of finished fiber 17 is round as shown in FIG. 2.

An alternative method of fabrication originates at the pre-form level of fiber optic manufacturing. One may fabricate a bulk pre-form that mimics the desired cladding shape(s) that can later be pulled to form very long lengths of fiber (several km) that possess the desired cross sectional and tapered cladding shape.

The ability of the double-clad fiber to convert low-quality, low brightness pump radiation into high brightness, signal radiation is performed by creating a situation where pump radiation in the cladding intersects and is absorbed in the fiber core as the pump radiation propagates down the geometrically modified fiber cladding. The core of the novel fiber 17 contains a rare earth dopant responsible for laser action and absorbs a portion of the intersecting pump radiation. For a round, cylindrical cladding, the effective absorption ($\alpha_{eff}$) of pump radiation in the core depends on fiber length (l), core and cladding areas ($A_{core}$ and $A_{clad}$) and dopant concentration or absorbance² ($\alpha$). This relationship is shown in Equation (1) immediately below.

$$\alpha_{eff} = \alpha \frac{A_{core}}{A_{clad}} \qquad \text{Equation (1)}$$

Figure 5:
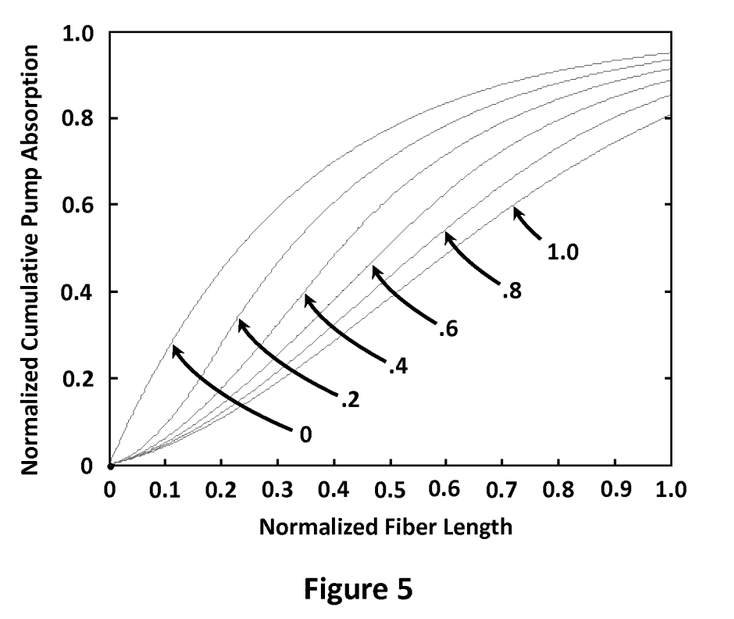
FIG. 5 is a graph showing how use of the modified cross section of the piece of fiber of the invention causes pump energy to be absorbed into the core of the laser more uniformly and not exponentially at the launching end of the fiber.
Figure 6:
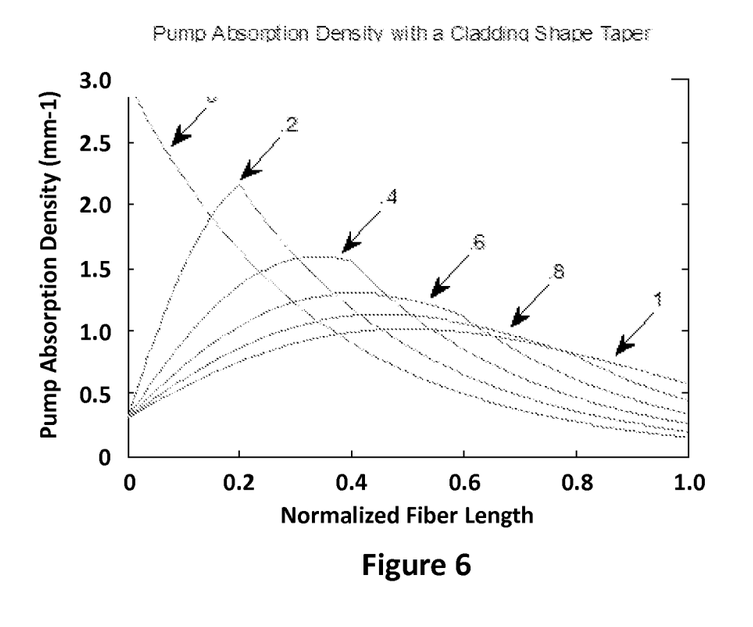
FIG. 6 is a graph showing how use of the invention displaces the peak thermal load from the launching end of the doped fiber to further down the fiber as the cladding shape taper ratio increases.

To use Equation (1) we assign a series of shape taper lengths to the thulium doped fiber 17 in terms of the total length of fiber 17; for this example normalized lengths of 0.2, 0.4, 0.6, 0.8 and 1.0 are utilized. For instance, a normalized taper length of 0.4 means the taper extends to 40% of the total length of thulium doped fiber 17. The absorption of a purely-octagonal cladding is 13 dB/m, or about 95% absorption. The impact on the taper length, for the $\beta_o$ to $\beta_{max}$ values chosen for this analysis, is shown in the graph of FIG. 5. For short lengths of tapers (<0.5 m) there is minimal impact (<10% difference) on total pump absorption. There is a dramatic difference in pump absorption at the launch end of doped fiber 17 when incorporating a cladding shape taper as indicated in the graph of FIG. 6 by the greatly reduced pump absorption density by utilizing novel fiber 17. The pump absorption density is the numerical derivative of the pump distribution and is considered to be the normalized power absorbed in the fiber with respect to the total launched pump power and has units of mm⁻¹. For example, a cladding shape taper free oscillator absorbs 0.3% of the total launched pump power in the first mm. Compared to a cladding shape taper ratio of 0.2 reduces that value to <0.05%/mm. The invention also displaces the peak thermal load from the input of the doped fiber (L=0) to further down the fiber as shown in FIG. 6. This is a key feature to exploit for the purposes of power scaling and thermal optimization.

Figure 4:
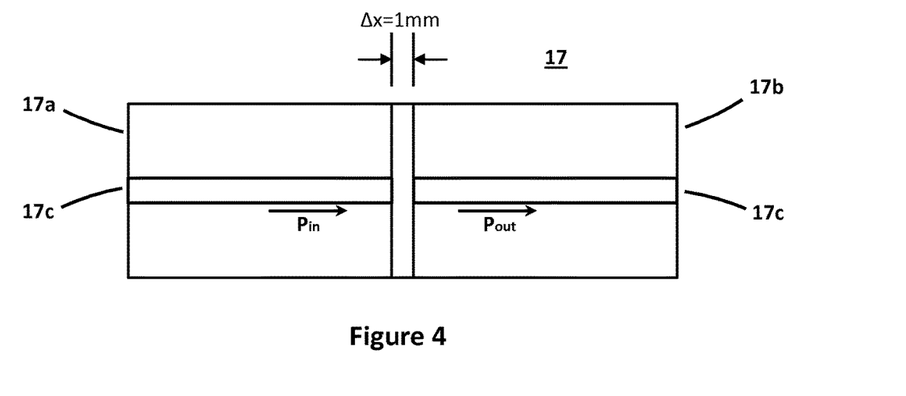
FIG. 4 is a side view of a piece of fiber cable used for analysis of absorption of pump energy by breaking the fiber down to 1 mm "slices" for numerical evaluation.

For analysis of heat distribution along fiber 17 during its design we consider the pump energy absorption in novel fiber 17 according to Beer's law including the effective cladding mode scattering coefficient β. Fiber 17 is broken down to 1 mm "slices" for numerical evaluation as shown in FIG. 4. Equation (2) below shows Beer's law in terms of dB/m and includes the cladding mode scattering coefficient β that is used to build a numerical simulation for novel fiber 17. The term a is the absorption of a doped fiber core at the pump wavelength λ when the cladding layer has no shape.

$$P_{out} = P_{in} 10^{(-\alpha\beta\Delta x/10)} \text{dB/m} \qquad \text{Equation (2)}$$

FIGS. 5 and 6 are described in the previous paragraph. FIG. 5 shows an exemplary distribution of pump signal when there is a cladding shape taper in terms of normalized cumulative pump absorption (0 to 1) versus normalized fiber length (0 to 1) for novel fiber 17. FIG. 5 shows how the normalized cumulative pump energy absorption into core 17c is not high at the launch end of fiber 17 but is more linear over the length of fiber 17. FIG. 6 shows an exemplary absorption of pump energy when there is a cladding shape taper in terms of pump absorption density (mm⁻¹) versus normalized fiber length (0 to 1) for novel fiber 17. FIG. 6 shows that without the cladding shape taper to modulate the absorption of pump energy into core 17c the absorption at the launch end is exponential which results in high thermal heat generated at the launch end. Examples are the curves marked 0 and 0.2. Fiber 17 more easily reaches its thermal limit and catastrophic failure occurs.

$$I_{abs} = I_o e^{-\alpha l} \qquad \text{Equation (3)}$$

Absorption of pump radiation in the active core of a fiber is normally exponential and follows Beer's Law in Equation (3) immediately above. However, this is not always the case for double-clad fiber lasers. High-order, "helical" cladding-modes supported by the fiber cladding 17d may not intersect the fiber core 17c and will not be absorbed by the dopant in the active core fiber. These helical modes significantly inhibit the effective absorption of pump radiation within the core 17c of the doped fiber 17. Effective absorption can be as low as 10% that of the expected value for round, cylindrical cladding structures due to the propagation of these helical modes. Alternative cladding geometries have solved the issue of helical modes very well and have given engineers a method to increase the total absorption per length of fiber without changing fiber composition. The shaped claddings prohibit helical cladding modes from propagating, forcing all cladding modes on a path that intersect the core 17c of the doped fiber 17. This results in significantly higher pump absorption coefficients for shaped claddings 17b vs. a classic round, cylindrical cladding 17a. Mathematically this is introduced as a cladding mode scattering coefficient β, and is related directly to the shape of the fiber cladding. The cladding mode scattering coefficient is highly dependent on the cladding shape and can vary drastically for the many different shapes of commercial optical fibers. The addition of the cladding mode scattering coefficient β to Equations (1) yields Equation (4), and the addition to Equation (3) yields Equation (5).

$$\alpha_{eff} = \beta \alpha \frac{A_{core}}{A_{clad}} \qquad \text{Equation (4)}$$

$I_{abs}=I_o e^{-\alpha\beta l}$      Equation (5)

Figure 7:
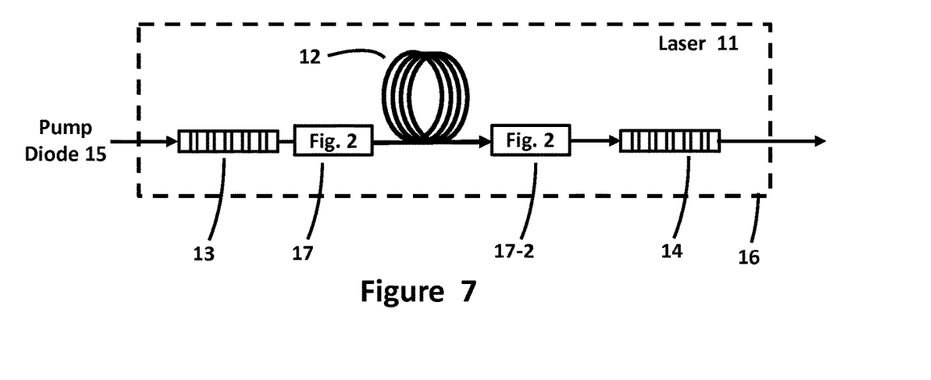
FIG. 7 shows an alternative embodiment of the invention that utilizes a piece of doped fiber in accordance with the teaching of the invention at both the launch end and the output end of a fiber-optic laser.

In FIG. 7 is shown an alternative embodiment of the invention where two pieces of the novel fiber 17 are utilized in a laser 11 (17 and 17-2). They are identical to the previous description of fiber 17 so further description is not repeated. The only difference is where the second piece of novel fiber 17-2 is mounted and how it is mounted. The cross sectional shape of the cladding at the right or output end of fiber 12 in laser 11 (FIG. 1) is octagonal so the end of novel fiber 17-2 having the octagonal shape 17b is connected thereto. The opposite end of novel fiber 17-2 has the round cladding shape and it is connected to medium reflector Bragg grating 14. Thus, the only difference is that novel fiber 17-2 is reversed and matches the shape and diameter of the fiber devices 12, 14 connected to it. Thus, novel fiber 17 is also used in this instance as a connection adapter.

Figure 8:
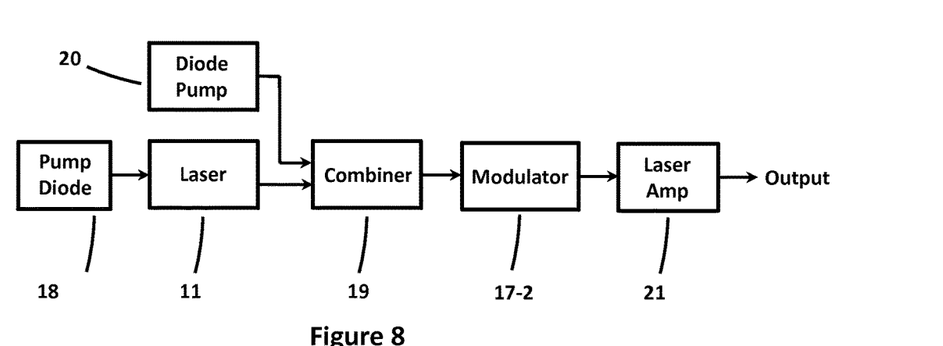
FIG. 8 shows another alternative embodiment of the invention where a fiber laser utilizing the teaching of the invention is used to implement a fiber amplifier.

In FIG. 8 is shown another alternative embodiment of the invention where a fiber laser 11 utilizing a fiber 17 in accordance with the teaching of the invention is used to implement a fiber amplifier amplifying the output of laser radiation from laser 11. The laser radiation output from laser 11 is input to a combiner 19 along with a pump signal from diode pump 20. Combiner 19 combines the two signals in a manner known in the art and inputs the two combined signals to the novel fiber 17_2 which performs in the manner previously described. Due to the higher radiation energy levels involved the energy modulation in fiber 17_2 may be somewhat different than in fiber 17 in laser 11 (not shown but previously described with reference to FIG. 1). More particularly, in fiber 17_2 the helical modes may be carried further into fiber 17b and the shape modulation of fiber 17b spreads the energy absorption into core 17c further along the fiber 17b. The signal output from modulator 17_2 is input to fiber amplifier 21 where it is amplified to generate a signal that is stronger than that output from laser 11.

While what has been disclosed herein is the preferred embodiment of the invention and two alternative embodiments, those skilled in the art will recognize that numerous changes may be made without departing from the spirit and scope of the invention. Therefore, the present invention should not be limited to any single embodiment, but rather construed in breadth and scope in accordance with the recitation of the appended claims.

The invention claimed is:

1. Apparatus for modulating the absorption of pump radiation in an optical fiber, the pump radiation being supplied by a source of pump radiation, the modulating apparatus comprising:
   a piece of clad fiber with a given length and with a rare earth element doped core, the piece of clad fiber having a cladding layer around the core, the piece of clad fiber having a first end and a second end;
   wherein the cladding layer at the first end of the clad fiber has a first cross section shape and the cladding layer at the second end of the clad fiber has a second cross section shape, and along the given length of the clad fiber the cross section shape of the cladding layer gradually changes from the first cross section shape to the second cross section shape;
   wherein the first cross-section shape of the cladding layer of the fiber is conducive to carrying only helical cladding modes that are created by pump radiation input to the first end of the fiber, the helical cladding modes transferring a least amount of the energy of the pump radiation carried in the cladding layer to the doped core of the fiber as the pump radiation in the cladding layer travels from the first end of the fiber toward the second end of the fiber;
   wherein the second cross-section shape of the cladding layer of the fiber is conducive to scattering the pump radiation in the cladding layer so that the pump radiation intersects the core of the fiber and its energy is transferred to the doped core of the fiber; and
   wherein as the pump radiation in the cladding layer of the fiber travels from the first end to the second end of the fiber, the gradually changing cross-section shape of the cladding layer causes a gradually increasing amount of the pump radiation in the cladding layer to be scattered and intersect the core of the fiber and transfer its energy to the doped core of the fiber further away from the first end of the fiber.

2. The apparatus for modulating the absorption of pump radiation in the optical fiber of claim 1 wherein starting at the first end of the clad fiber and for a given distance there along going toward the second end of the clad fiber the cross section of the cladding layer remains at the first cross section shape, and little of the pump radiation in the cladding layer is scattered and intersects the core of the fiber, and this minimizes the generation of thermal heat at the first end of the fiber and the gradually changing shape of the cladding layer from the first cross section shape to the second cross section shape spreads the generation of thermal heat along the remainder of the fiber of the modulating apparatus.

3. The apparatus for modulating the absorption of pump radiation in the optical fiber of claim 2 wherein the first cross section shape is circular and the second cross section shape is octagonal.

4. The apparatus for modulating the absorption of pump radiation in the optical fiber of claim 3 wherein the cross-sectional area of the cladding layer tapers between the first end and the second end of the optical fiber.

5. The apparatus for modulating the absorption of pump radiation in the optical fiber of claim 4 wherein the gradually changing cross section shape of the cladding layer causing the gradually increasing amount of the pump radiation carried in the cladding layer to be scattered and intersect the core of the optical fiber thereby causes thermal energy generated by the pump radiation transferred to the doped core to be spread along the length of the optical fiber.

6. The apparatus for modulating the absorption of pump radiation in the optical fiber of claim 1 wherein the first cross section shape is circular and the second cross section shape is octagonal.

7. The apparatus for modulating the absorption of pump radiation in the optical fiber of claim 1 wherein the cross-sectional area of the cladding layer tapers between the first end and the second end of the optical fiber.

8. The apparatus for modulating the absorption of pump radiation in the optical fiber of claim 5 wherein the dopant in the rare earth element doped core is Thulium.

9. The apparatus for modulating the absorption of pump radiation in the optical fiber of claim 1 wherein the dopant in the rare earth element doped core is Thulium.

10. A method for modulating the absorption of pump radiation into a rare earth element doped core of an optical fiber having a cladding layer around the doped core and the pump radiation is carried in the cladding layer, the method comprising the steps of:
   gradually changing the cross sectional shape of the cladding layer along the length of the optical fiber between a first shape at a first end of the fiber and a second cross sectional shape at a second end of the fiber; and
   applying the pump radiation to the first end of the fiber;

wherein the first cross-sectional shape of the cladding layer of the fiber is conducive to carrying only a helical cladding mode that is created by the pump radiation applied to the first end of the fiber, the helical cladding mode transferring a least amount of the pump radiation being carried in the cladding layer to the doped core of the fiber as the pump radiation travels from the first end of the fiber toward the second end of the fiber;

wherein the second cross-sectional shape of the cladding layer of the fiber is conducive to scattering the pump radiation carried in the cladding layer so that the scattered pump radiation intersects the core of the optical fiber and the pump radiation is transferred to the doped core of the optical fiber;

wherein as the pump radiation in the cladding layer of the optical fiber travels from the first end to the second end of the fiber, the gradually changing cross-sectional shape of the cladding layer causes a gradually increasing amount of the pump radiation carried in the cladding layer to be scattered to intersect the core of the optical fiber and thereby gradually increase the amount of pump radiation being transferred to the doped core further away from the first end of the optical fiber.

11. The method for modulating the absorption of pump radiation into a doped core of an optical fiber of claim 10 wherein in implementing the step of gradually changing the cross sectional shape of the cladding layer, for a given distance along the fiber starting from the first end of the fiber the cladding layer remains at the first cross-sectional shape and little of the pump radiation in the cladding layer is scattered and intersects the core of the fiber to be transferred to the doped core of the fiber, and this minimizes the generation of thermal heat at the first end of the optical fiber, and from the end of the given distance along the fiber and to the second end of the fiber the cross-sectional shape of the cladding layer gradually changes between the first shape and the second shape.

12. The method for modulating the absorption of pump radiation into a doped core of an optical fiber of claim 11 wherein the first cross-sectional shape is circular and the second cross-sectional shape is octagonal.

13. The method for modulating the absorption of pump radiation into a doped core of an optical fiber of claim 12 wherein the cross-sectional area of the cladding layer tapers between the first end and the second end of the optical fiber.

14. The method for modulating the absorption of pump radiation into a doped core of an optical fiber of claim 13 wherein the gradually changing cross-sectional shape of the cladding layer causing the gradually increasing amount of the pump radiation carried in the cladding layer to be scattered and intersect the core of the optical fiber thereby causes thermal energy generated by the pump radiation transferred to the doped core to be spread along the length of the optical fiber.

15. The method for modulating the absorption of pump radiation into a doped core of an optical fiber of claim 10 wherein the first cross-sectional shape is circular and the second cross-sectional shape is octagonal.

16. The method for modulating the absorption of pump radiation into a doped core of an optical fiber of claim 10 wherein the cross-sectional area of the cladding layer tapers between the first end and the second end of the optical fiber.

17. The method for modulating the absorption of pump radiation into a doped core of an optical fiber of claim 14 wherein the dopant is Thulium.

18. The method for modulating the absorption of pump radiation into a doped core of an optical fiber of claim 10 wherein the dopant is Thulium.

19. The method for modulating the absorption of pump radiation into a doped core of an optical fiber of claim 16 wherein the cross-sectional area of the cladding layer tapers in either a linear or non-linear manner.

\* \* \* \* \*